United States Patent [19]
Chang

[11] Patent Number: 5,087,208
[45] Date of Patent: Feb. 11, 1992

[54] MOVABLE TELEPHONE ADAPTER

[76] Inventor: Gong-hwa Chang, 5F-23, 70, Fu-Shing Road, Taoyuan, Taiwan

[21] Appl. No.: 699,132

[22] Filed: May 13, 1991

[51] Int. Cl.$^5$ .......................................... H01R 27/00
[52] U.S. Cl. ................................... 439/224; 439/676
[58] Field of Search ............... 439/165, 224, 676, 534

[56] References Cited

U.S. PATENT DOCUMENTS 4,946,401 8/1990 Hori et al. ................... 439/676 X Primary Examiner—Eugene F. Desmond
Attorney, Agent, or Firm—Bacon & Thomas

[57] ABSTRACT

A movable telephone adapter for connecting an exchange line to a telephone set, including two receptacle supports fastened in a base for holding a telephone receptacle in an opening on an upper cover which is attached to the base. The base has two retaining plates corresponding to the two retainers on the upper cover for quickly mounting the upper cover to the base. By engaging the projecting edges of the telephone receptacle in the holes on the receptacle supports, the telephone receptacle can be rotated on the receptacle supports. By engaging the cross-shaped, raised portions of the telephone receptacle in the cross-shaped grooves on the receptacle supports, the telephone receptacle may be alternatively positioned at either a horizontal or a vertical position relative to the receptacle supports.

4 Claims, 3 Drawing Sheets

MOVABLE TELEPHONE ADAPTER

BACKGROUND OF THE INVENTION

The present invention relates to telephone adapters, and more particularly to a movable telephone adapter which can be adjusted to a desired angle fitting in which the telephone cord of the telephone set may be connected.

A telephone adapter is commonly used for connecting an exchange line to a telephone set. A telephone adapter generally comprises a telephone receptacle having a connector for connecting the receptacle to the telephone line of a telephone set. According to conventional structure, the telephone receptacle of a telephone adapter is set in a specific fixed angle. For mounting at a different angle position, a different telephone adapter is required. The manufacturing of telephone adapters in different specifications will increase the manufacturing cost. The present invention has been accomplished with the foregoing circumstances under consideration. The movable telephone adapter of the present invention realizes the following advantages:

1. The telephone receptacle of the telephone adapter and the connector thereof can be conveniently adjusted to a desired angle to fit the telephone line of the telephone set to be connected;
2. Product specification can be standardized to facilitate the manufacturing process and reduce manufacturing cost;
3. Because the telephone receptacle of the telephone adapter can be changed to an optimum fit angle, installation of a telephone set is facilitated; and
4. For connecting a 4-wire exchange line, two additional supporting bars can be attached to the base without changing the whole assembly.

SUMMARY OF THE INVENTION

According to the present invention, there is provided a movable telephone adapter for connecting an exchange line to a telephone set, which comprises two receptacle supports fastened in a base for holding a telephone receptacle in an opening on an upper cover which is attached to said base. The base has two retaining plates corresponding to the two retainers on the upper cover for quickly mounting the upper cover. By engaging the projecting edges of the telephone receptacle in the holes on the receptacle supports, the telephone receptacle can be rotated on the receptacle supports. By engaging the cross-shaped, raised portions of the telephone receptacle in the cross-shaped grooves on the receptacle supports, the telephone receptacle may alternatively be positioned at either a horizontal or a vertical position relative to the receptacle supports.

DETAILED DESCRIPTION OF THE PREFERRED EMBODIMENTS

Figure 1:
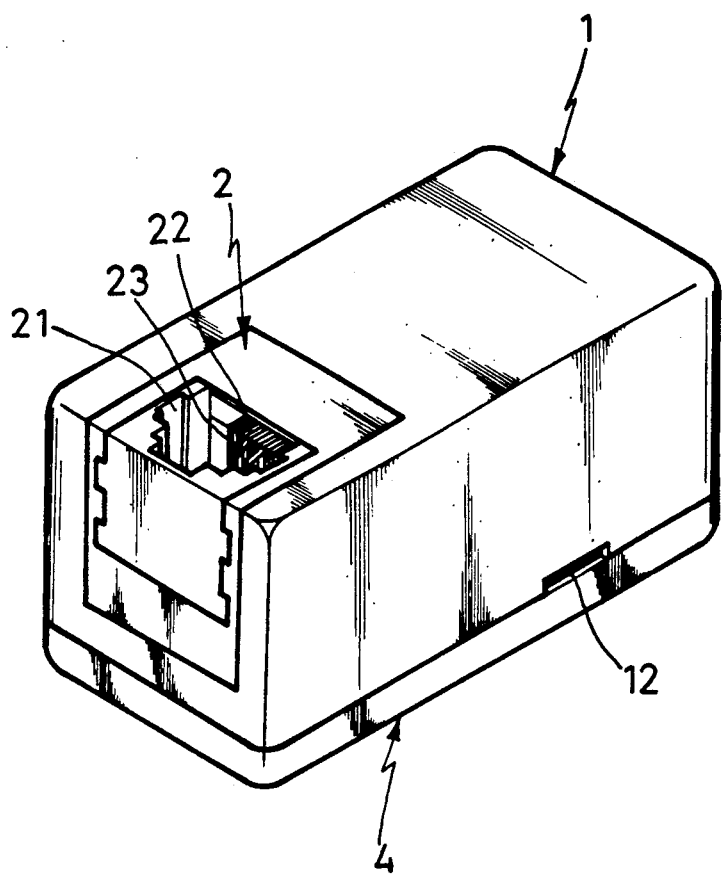
FIG. 1 is a perspective view of a telephone adapter embodying the present invention.
Figure 2:
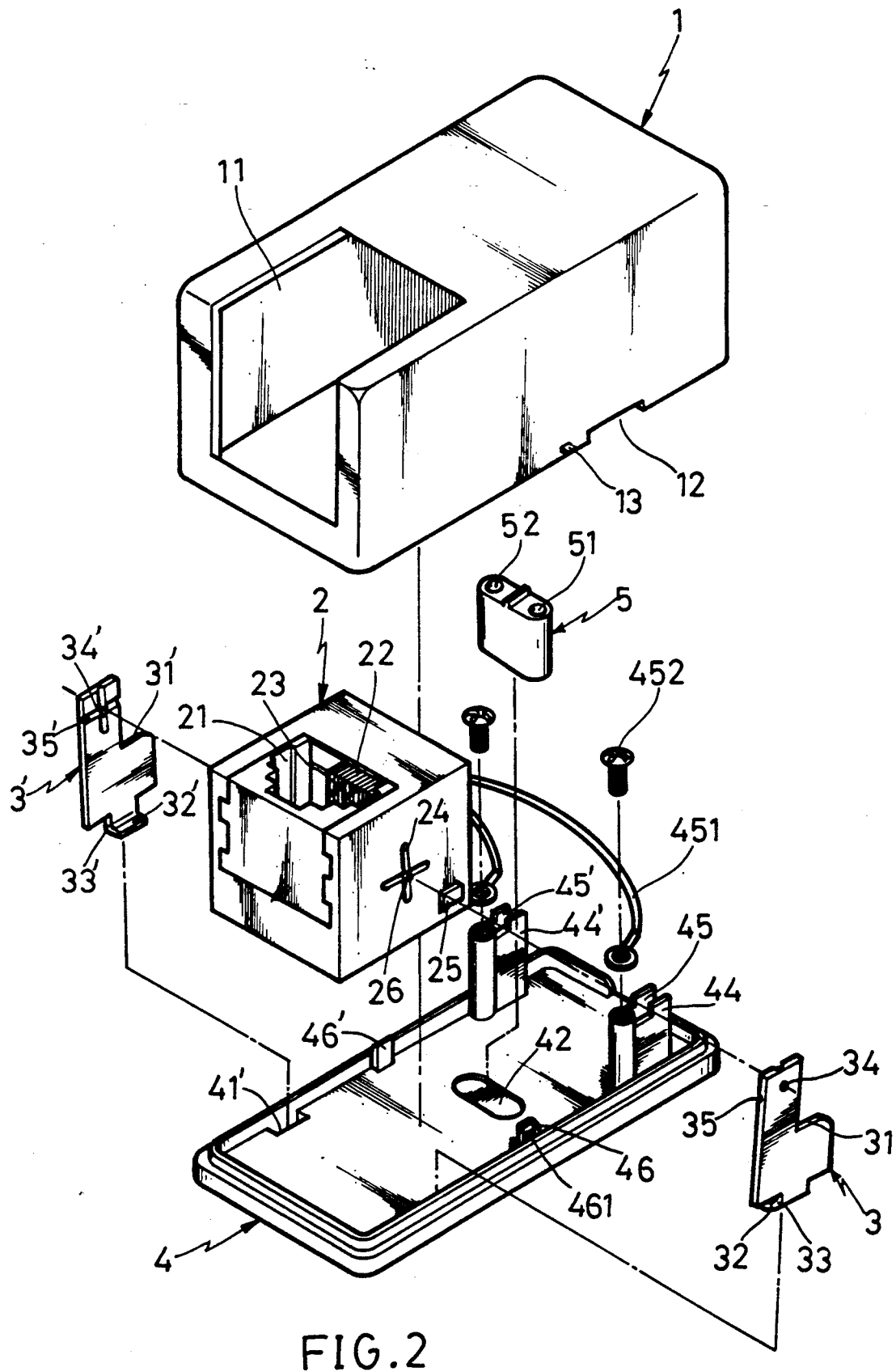
FIG. 2 is an exploded perspective view thereof.

Referring to FIGS. 1 and 2, a telephone adapter in accordance with the present invention is generally comprised of an upper cover 1, a telephone receptacle 2, two receptacle supports 3 and 3', a base 4, and an exchange line holder 5. The upper cover 1 is attached to the base 4 and defines therewith a holding space. Cover 1 includes an opening 11 at one end in which the telephone receptacle 2 is movably set and a notch 12 on the bottom edge thereof for inserting a pry tool. The telephone receptacle 2 has a jack 21 for fastening a telephone plug (not shown) and permitting the contact terminals 23 of the connector 22 thereof to firmly retain said telephone plug in place. The telephone plug and the connector 22 are of the known art and need not be further described.

Figure 3:
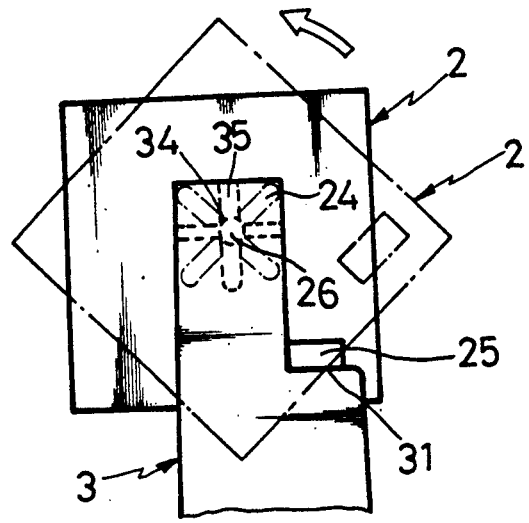
FIG. 3 illustrates an operation in adjusting the angle position of the telephone receptacle relative to the supports.

In the present preferred embodiment, the telephone receptacle 2 is designed to be alternatively positioned between angles of either 0° or 90°. Therefore, the telephone receptacle 2 comprises two cross-shaped, raised portions 24 and two stop blocks 25 at two opposite sides. The cross-shaped, raised portions 24 each have a projecting edge 26 at the center thereof. After the telephone receptacle 2 is mounted on the two receptacle supports 3 and 3' and set at a 90° angle, the stop blocks 25 are respectively engaged against stop edges 31 and 31'. The base 4 has two retaining notches 41 and 41' at two opposite sides (the retaining notch 41 is not shown) for fastening the two receptacle supports 3 and 3'. The receptacle supports 3 and 3' have each a hooked bottom end 32 or 32' respectively fastened in the retaining notches 41 and 41' of the base 4, which hooked bottom end 32 or 32' has a curved portion 33 or 33' at a suitable location. Because of the effect of the curved portions 33 or 33', the two receptacle supports 3 and 3' will slightly incline inwards and be allowed to be respectively slightly expanded outwards after having been respectively fastened in the retaining notches 41 and 41'. To support the telephone receptacle 2 in an alternative position, the two receptacle supports 3 and 3' each have a cross-shaped groove 35 or 35' and a hole 34 or 34' matching with the cross-shaped, raised portion 24 and a projection 26 on either side of the telephone receptacle 2. After having been mounted on the two receptacle supports 3 and 3', the telephone receptacle 2 can be rotated on the axis about the two projections 26 of the two cross-shaped, raised portions 24 relative to the two receptacle supports 3 and 3' (see FIG. 3) for depiction of this angle position change. Alternatively, holes 34 and 34' and cross-shaped grooves 35 and 35' may be provided on telephone receptacle 2 and raised portions 24 and projections 26 may be provided on receptacle supports 3 and 3'. The exchange line holder 5 is fastened in a recessed hole 42 on the base 4, having two holes 51 and 52 for fastening the two conductors of an exchange line. The base 4 further comprises two conductive supporting bars 44 and 44' at two opposite sides for fastening conductors 451 from the connector 22 by screws 452, and two small retaining plates 46 and 46' at two opposite sides for fastening the upper cover 1, wherein the supporting bars 44 and 44' have each a trough 45 for inserting the conductors of the exchange line, the retaining plates 46 and 46' each have a retaining hole 461 for fastening the retainer 13 which is made on either side of the upper cover 1.

Figure 4:
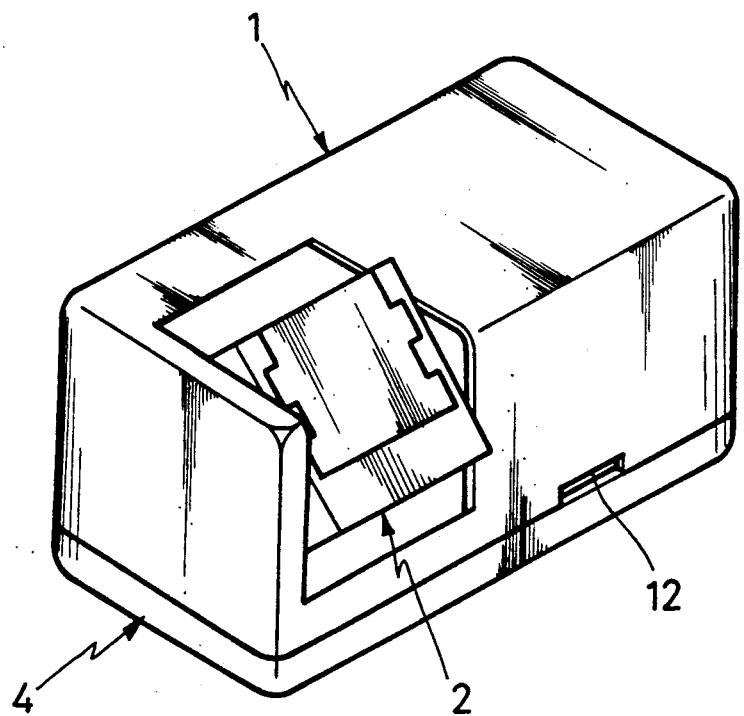
FIG. 4 illustrates an alternate form of the present invention.

Referring to FIG. 4, there is illustrated an alternate form of the present invention in which the opening on the upper cover 1 for the telephone receptacle 2 is disposed in a direction vertical to the opening at the aforesaid first embodiment.

What is claimed is:

1. A movable telephone adapter, comprising:
   a) an upper cover including two opposite sides and defining a holding space, an opening provided in the upper cover, a notch formed at one side for inserting a pry tool, and a retainer provided at each of the two opposite sides;
   b) a telephone receptacle including a plug hole and a connector fastened therein for connecting the connector of a telephone line from a telephone set, the receptacle including a pair of first cross-shaped means and a pair of stop blocks at two opposite sides thereof;
   c) a base including a pair of retaining notches and a pair of retaining means at two opposite sides, the pair of retaining means being engaged by the retainers of the upper cover to secure the upper cover to the base, an exchange line holder for holding an exchange line in place, and a pair of conductive supporting bars, each supporting bar having one end for connection with the exchange line and an opposite end connected to the connector;
   d) a pair of receptacle supports, each receptacle support including a hooked bottom end secured in one of the retaining notches and a second cross-shaped means engageable with the first cross-shaped means for securing the telephone receptacle in position so that when the upper cover is secured to the base to hold the telephone receptacle in the opening, the telephone receptacle is permitted to be moved and alternatively positioned at either a horizontal position or a vertical position relative to the receptacle supports.

2. The movable telephone adapter of claim 1 wherein each of the receptacle supports includes a curved portion at the hooked bottom end thereof to permit the receptacle supports to incline inwardly for securing the telephone receptacle to the base.

3. The movable telephone adapter of claim 1 wherein the first cross-shaped means includes a cross-shaped groove and a hole, the second cross-shaped means includes a cross-shaped raised portion and a projection, and wherein the cross-shaped raised portion is engaged within the cross-shaped groove and the projection is engaged within the hole.

4. The movable telephone adpator of claim 1 wherein the first cross-shaped means includes a cross-shaped raised portion and a projection, the second cross-shaped means includes a cross-shaped groove and a hole, and wherein the cross-shaped raised portion is engaged within the cross-shaped groove and the projection is engaged within the hole.

* * * * *